United States Patent
Arpit et al.

(10) Patent No.: US 12,406,210 B2
(45) Date of Patent: Sep. 2, 2025

(54) TECHNIQUES FOR MACHINE LEARNING MODEL SELECTION FOR DOMAIN GENERALIZATION

(71) Applicant: Salesforce, Inc., San Francisco, CA (US)

(72) Inventors: Devansh Arpit, Pacifica, CA (US); Huan Wang, Palo Alto, CA (US); Yingbo Zhou, Palo Alto, CA (US); Caiming Xiong, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 695 days.

(21) Appl. No.: 17/663,595

(22) Filed: May 16, 2022

(65) Prior Publication Data

US 2023/0368078 A1     Nov. 16, 2023

(51) Int. Cl.
*G06N 20/20* (2019.01)
*G06F 18/20* (2023.01)
*G06F 18/21* (2023.01)

(52) U.S. Cl.
CPC ........... *G06N 20/20* (2019.01); *G06F 18/217* (2023.01); *G06F 18/285* (2023.01)

(58) Field of Classification Search
CPC ..................................................... G06N 20/20
See application file for complete search history.

(56) References Cited

U.S. PATENT DOCUMENTS

| 12,009,071 B2* | 6/2024 | Kim | G16H 50/70 |
| 2022/0121884 A1* | 4/2022 | Zadeh | G06N 3/006 |
| 2022/0253734 A1* | 8/2022 | Aghdasi | G01N 33/383 |
| 2023/0305904 A1* | 9/2023 | Lowe | G06F 11/3414 |

OTHER PUBLICATIONS

NPL Aprit Ensemble of Averages Inventor Pub Oct. 2021.*
NPL Brownlee A Gentle Introduction to Ensemble Learning Algorithms 2021.*
NPL Brownlee How to Develop a Weighted Average Ensemble 2020.*
NPL Brownlee Moving Average Smoothing for Data Preparation Time Series 2020.*
NPL Dong A survey on ensemble learning 2019.*
NPL Ganaie Ensemble deep learning_A review Mar. 2022.*
(Continued)

*Primary Examiner* — Paul M Knight
(74) *Attorney, Agent, or Firm* — Holland & Hart LLP

(57) ABSTRACT

A computing device may perform training of a set of machine learning models on a first data set associated with a first domain. In some examples, the training may include, for each machine learning model of the set of machine learning models, inputting, as values for a set of parameters of the respective sets of parameters and for an iteration of a set of iterations, a moving average of the set of parameters calculated over a threshold number of previous iterations. The computing device may select a set of model states that are generated during the training of the plurality of machine learning models based on a validation performance of the set of model states performed during the training. The computing device may then generate an ensembled machine learning model by aggregating the set of machine learning models corresponding to the set of selected model states.

20 Claims, 10 Drawing Sheets

(56) References Cited

OTHER PUBLICATIONS

NPL Gulrajani In Search of Lost Domain Generalization 2020.*
NPL Izmailov Averiging Weights Leads to Wider Optima and Better Generalization 2019.*
NPL Jain Parallelizing SGD for Least Squares Regression 2018.*
NPL Kandaswamy Deep Transfer Learning Ensemble 2015.*
NPL Lim Ensemble Averaging Mar. 2022.*
NPL Liu Ensemble Transfer Learning Algorithm 2017.*
NPL Muecke Beating SGD Saturation with Tail Averaging and Minibatching 2019.*
NPL Prado Forecasting based on ensemle Autoregressive Moving Average 2020.*
NPL Tao Deep Neural Network Ensembles 2019.*
NPL Zhao Transfer Learning with Ensemble 2018.*
NPL Zhu Ensemble transfer learning 2020.*

* cited by examiner

TECHNIQUES FOR MACHINE LEARNING MODEL SELECTION FOR DOMAIN GENERALIZATION

FIELD OF TECHNOLOGY

The present disclosure relates generally to database systems and data processing, and more specifically to techniques for machine learning model selection for domain generalization.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Mathematical models (such as machine learning models) may include model parameters. A model parameter may be a configuration variable that is internal to the mathematical model. Such model parameters may be learnt through training of the mathematical models. Machine learning models may work well on data from the same domain as the training data. However, some techniques may lack the ability to train a mathematical model to account for domain generalization. For example, domain generalization may refer to when data during inference comes from a distribution that is different from the training distribution.

DETAILED DESCRIPTION

Figure 1:
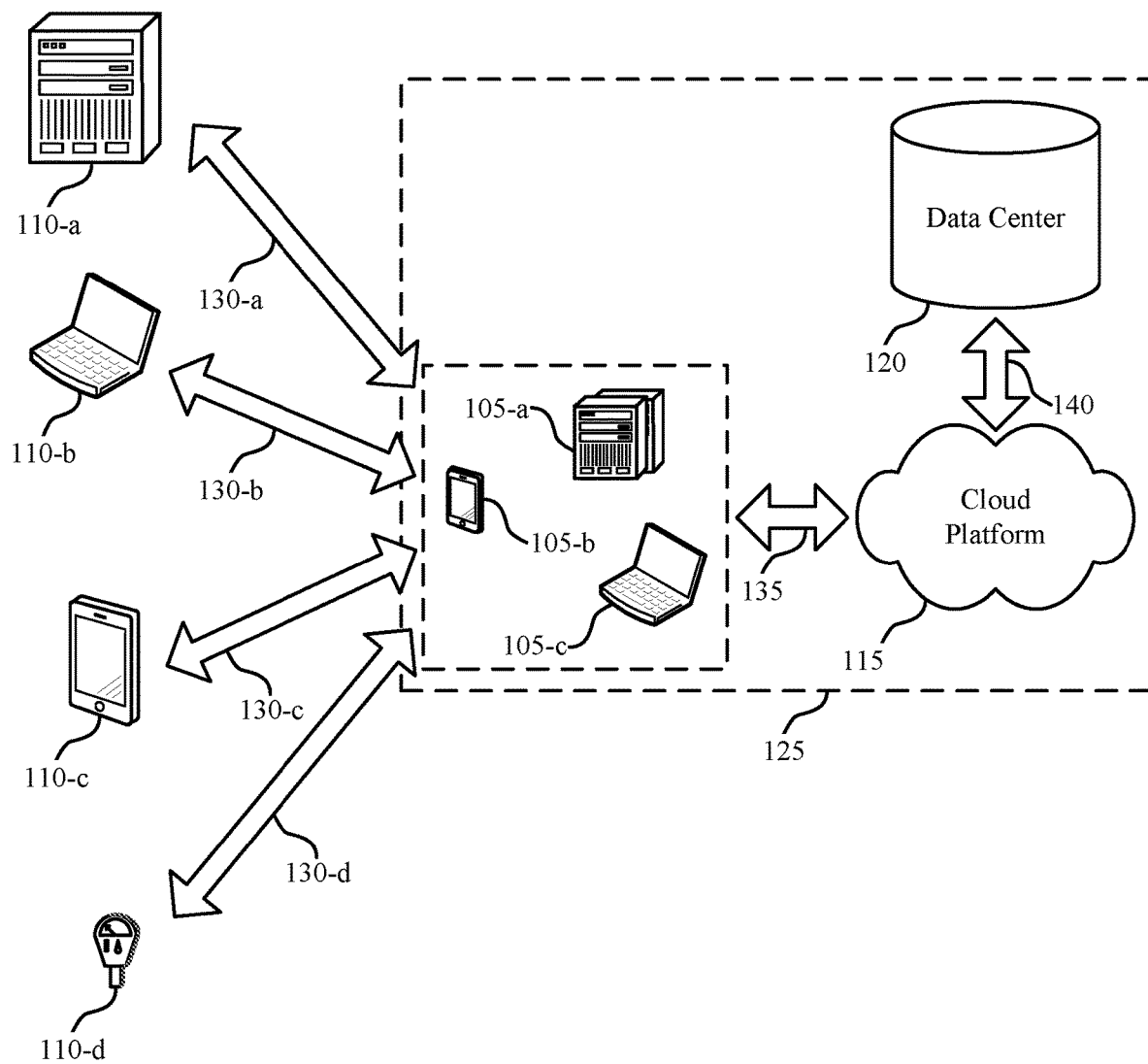
FIG. 1 illustrates an example of data processing at an application server system that supports techniques for machine learning model selection for domain generalization in accordance with aspects of the present disclosure.

Some systems (e.g., artificial intelligence systems supporting customer relationship management (CRM) and one or more datasets) may support a user-friendly, interactive data analytics application. Such an application may receive a request to run one or more mathematical models (or machine learning models) on different data sets. As one example, a user may input a request to run or develop a mathematical model into a data analytics application running on a user device. In some cases, the data analytics application on the user device may transmit the request to a server (such as an application server). Developing a mathematical model (or machine learning model) may include training the mathematical model. Machine learning models may work well on data having the same domain as the training data. Domain generalization aims at learning predictors that generalize well on data sampled from test distributions that are different from the training distribution.

In domain generalization settings, machine learning models trained on a given set of training domains may have unreliable performance on distribution shifted test domains, and may have stochasticity in performance. In particular, machine learning models trained on a given set of training domains may not be able to perform on distribution shifted test domains. This makes deploying machine learning models (e.g., deep learning models) unreliable in real world settings (settings where the training data and the data used for inference belong to different domains). The techniques depicted herein provide for a protocol for averaging model parameters along an optimization path, starting early during training.

Aspects of the present disclosure describe a training mechanism that takes an average of machine learning model parameters along an optimization path such that the resulting trained machine learning models benefit from the mix of learned knowledge and may improve their performance when being extended to different domains. In particular, when training on a set of data points, the techniques provided herein describe maintaining a moving average of a vector of parameters on a per model basis. That is, a system may train each machine learning model using a vector of parameters for each iteration. For a subsequent iteration, a moving average of the vector of parameters of the model being trained may be maintained during the training process. Instead of calculating the moving average starting from initialization of the model, the techniques provide for starting the averaging after a number of iterations to during training (tail averaging), and maintaining the moving average until the end of training. For each machine learning model, the system may select a moving average state of the vector of parameters having the highest performance (to reduce overfitting). Next, the system may perform ensembling of the moving average models (averaging the states for each machine learning model) to generate a an ensembled machine learning model. In particular, the system generates the ensembled machine learning model by aggregating a set of machine learning models corresponding to a set of selected model states. The system then performs an inference based on deploying the final model on a data set having a different domain than the training data. For instance, the system may perform a machine learning prediction using the ensembled machine learning model on a second data set associated with a second domain different from the first domain. In some cases, an output of the ensembled machine learning model may be a dimension-wise average of respective outputs from the set of machine learning models in the ensembled machine learning model.

Thus, the techniques depicted herein provide for significantly boosting domain generalization and diminishing the impact of stochasticity by improving the rank correlation between the in-domain validation accuracy and out-domain test accuracy, which may be utilized for reliable model selection.

Aspects of the disclosure are initially described in the context of an environment supporting an on-demand database service. Aspects of the disclosure are further described in the context of a system and a process flow. Aspects of the disclosure are further illustrated by and described with reference to apparatus diagrams, system diagrams, and flowcharts that relate to techniques for machine learning model selection for domain generalization.

FIG. 1 illustrates an example of a system 100 for cloud computing that supports techniques for machine learning model selection for domain generalization in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Domain generalization in training of machine learning models may be used to learn predictors that generalize well on data sampled from test distributions that are different from the training distribution. In some examples, deep learning models may demonstrate poor performance at this form of generalization, and excel primarily in a setting including independent and identically distributed random variables.

Some machine learning models may be designed to mitigate this drawback using empirical risk minimization along with a model selection techniques (i.e., early stopping using validation set), using a subset of data from all the training domains. Such machine learning models may largely match or even outperform the performance of existing domain generalization algorithms. However, such machine learning models may not have a high reliability associated with model selection. In particular, the out-domain performance may vary greatly along the optimization trajectory of a machine learning model during training, even though the in-domain performance may not vary. This instability hurts the reliability of model selection, and may become a problem in realistic settings where test domain data is unavailable. In particular, without being able to generalize performance across multiple domains, deploying a machine learning model may cause a rank correlation between in-domain validation accuracy and out-domain test accuracy to be weak.

In contrast, the system 100 provides for model averaging that both boosts domain generalization, and mitigates performance instability of deep models on out-domain data, specifically with respect to in-domain validation data. This makes model selection more reliable. In addition, the system 100 supports ensembling of moving average models to mitigate the lack of performance in domain generalizations settings. Additionally or alternatively, the system 100 may support generation of an ensembled machine learning model that further boosts performance of machine learning models of test data having a domain different from training data.

The system 100 may first perform training of a set of machine learning models on a first data set associated with a first domain. The set of machine learning models may include respective sets of parameters that are updated across a set of iterations during the training. According to one or more aspects of the present disclosure, as part of the training, for each machine learning model of the set of machine learning models, the subsystem 125 may input, as values for a set of parameters of the respective sets of parameters and for an iteration of the set of iterations, a moving average of the set of parameters calculated over a threshold number of previous iterations. The subsystem 125 may then select a set of model states that are generated during the training of the set of machine learning models. In some cases, the set of model states may be selected based on a validation performance of the set of model states performed during the training. That is, the subsystem 125 may determine a model state corresponding to each machine learning model, that provides a high performance.

Such moving average models may have a more stable out of domain performance compared to unaveraged models. The rank correlation between in-domain validation accuracy and out-domain test accuracy along the optimization trajectory may also be better for moving average models. Thus, model selection may be more reliable when the subsystem 125 makes predictions on a validation set using the moving average models. In particular, starting averaging early during training, may boost domain generalization. However, since the rank correlation may be poor between validation and test accuracy of independently trained models, it may be difficult to discover a machine learning model having high performance (for out-domain performance) from a pool of independently trained models, based on their in-domain validation performance. To enhance the performance of the machine learning model on out of domain data, the subsystem 125 may generate an ensemble of moving average models. In particular, the subsystem 125 may generate an ensembled machine learning model by aggregating the set of machine learning models corresponding to the set of selected model states (the optimal states for each machine learning model). The frequency of model averaging may not have a significant impact on performance, unless sampling is done at too large intervals.

The ensemble of moving average models may outperform an ensemble of unaveraged models. The subsystem 125 may perform a machine learning prediction using the ensembled machine learning model on a second data set associated with a second domain different from the first domain. In such case, an output of the ensembled machine learning model may be a dimension-wise average of respective outputs from the set of machine learning models in the ensembled machine learning model. An ablation analysis may indicate that the rank correlation between in-domain validation performance and out-domain test performance is also better for the ensemble of average models.

In some examples, the subsystem 125 may train the set of machine learning models using image data. Such image data may include a set of images each having a set of parameters (e.g., brightness, contrast, sharpness, color saturation, etc.). The subsystem 125 may generate an ensembled machine learning model and then use the ensembled machine learning model to predict images having a different set of parameters. For instance, the ensembled machine learning model may be trained using photographs of cats and the ensembled machine learning model may be used to predict cartoons of cats. In such cases, the ensembled machine learning model may improve the baseline performance (e.g., around 4%-5% test accuracy gain on average).

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
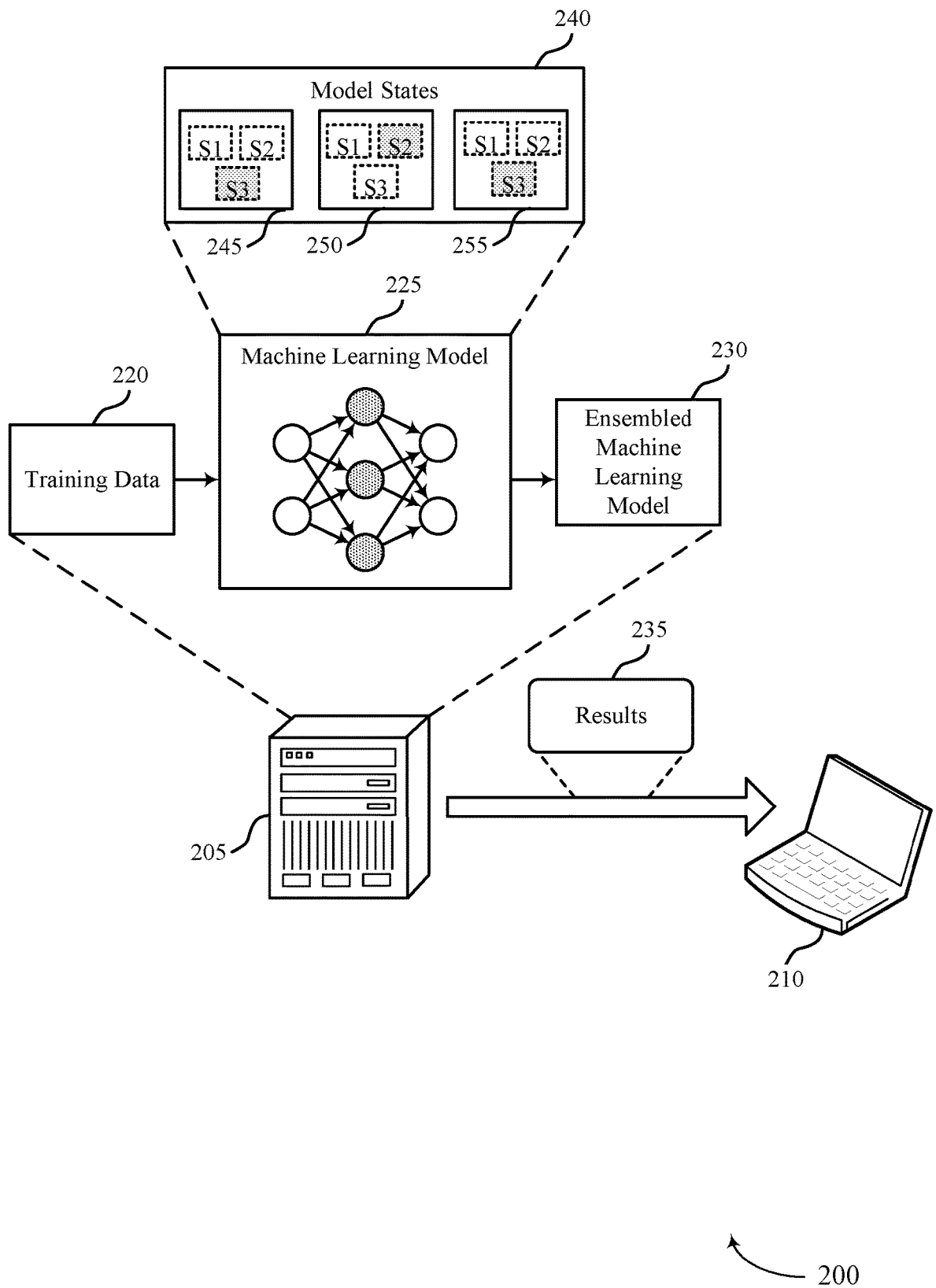
FIG. 2 illustrates an example of a system that supports techniques for machine learning model selection for domain generalization in accordance with aspects of the present disclosure.

FIG. 2 illustrates an example of a system 200 that supports techniques for machine learning model selection for domain generalization in accordance with aspects of the present disclosure. The system 200 may be an example of a system 100, as described with reference to FIG. 1. The computing device 205 may support a CRM platform, in some examples. For example, the computing device 205 may be an example of an application server, a database server, a cloud-based server or service, a worker server, a server cluster, a virtual machine, a container, or any combination of these or other computing devices. The user device 210 may be an example of a contact 110, such as a laptop, a desktop computer, a tablet, a smart phone, a smart watch, a smart television, or any other user-operated device. The user device 210 may access an application supporting to access the computing device 205. For example, a user operating the user device 210 may log into the application, and the computing device 205 may send, for display in the user interface of the user device 210, information relating to a platform for generating or accessing an ensembled machine learning model. In some alternative examples, the user device 210 may host the application to generate the ensembled machine learning model locally at the user device 210, and one or more operations described herein with respect to the computing device 205 may alternatively be performed by the user device 210. The system 200 may use techniques described herein to improve out-domain performance by machine learning model selection for domain generalization.

The system 200 may perform model averaging followed by ensembling machine learning models. For a given supervised learning objective function, $f_\theta(\cdot)$ may denote a deep network being optimized using gradient based optimizer, where $\theta$ denotes the parameters of this model. $f_\theta$ may be referred to as an online model, or unaveraged model. The output of $f_\theta(\cdot)$ may be a vector of K logits corresponding to the K classes in the supervised task. The computing device 205 may use an input of training data 220 to train the machine learning model 225. The computing device 205 may perform training of a set of machine learning models on a first data set associated with a first domain (e.g., training data 220). The set of machine learning models may include respective sets of parameters that are updated across a set of iterations during the training. As part of the training, for each machine learning model, the computing device 205 may input, as values for a set of parameters of the respective sets of parameters and for an iteration of the set of iterations, a moving average of the set of parameters calculated over a threshold number of previous iterations. That is, the computing device 205 may maintain a moving average of the machine learning model's 225 parameters. The deep network (e.g., machine learning model 225) whose parameters are set to be this moving average may be referred to as the moving average model, or more specifically simple moving average model. The parameters of this model may be denoted by $\hat{\theta}$.

As the simple moving average of the online model, instead of calculating the moving average starting from initialization, the computing device 205 may instead start after a number of iterations t0 during training (tail averaging), and maintain the moving average until the end of training. In some examples, the computing device 205 may choose t0 to be close, but not equal to the initialization. For instance, the computing device 205 may start a calculation of the moving average of the set of parameters after a configured number of iterations from a starting iteration of the set of iterations.

At any iteration t, the computing device 205 denote the following:

$$\hat{\theta}_t = \begin{cases} \theta_t \\ \frac{t-t_0}{t-t_0+1} \cdot \hat{\theta}_{t+1} + \frac{1}{t-t_0+1} \cdot \theta_t \end{cases}$$

if $t<=t_0$, where $\theta_t$ is the online model's state at iteration t. Further, at iteration t, the computing device 205 may calculate validation performance using $\hat{\theta}_t$, and not $\theta_t$. The benefit of doing so is that the rank correlation between in-domain validation accuracy and out-domain test accuracy is better when predictions are made using $\hat{\theta}_t$. This makes model selection more reliable for domain generalization. Finally, for a given run, model selection may select $\hat{\theta}_t$ for making test set predictions, such that $\hat{\theta}_t$ achieves high validation performance.

According to one or more aspects, the computing device 205 may select a set of model states 240 that are generated during the training of the set of machine learning models (e.g., machine learning model 225). In some examples, the computing device 205 may select the set of model states 240 based on a validation performance of the set of model states 240 performed during the training. The computing device 205 may determine, for one or more iterations of the set of iterations, a validation performance value associated with a current state of a machine learning model. The computing device 205 may select a model state for one or more machine learning models based on a highest validation performance value for the corresponding machine learning model across all iterations of a set of iterations.

In some examples, the computing device 205 may select a set of model states that a generated during the training of the set of machine learning models, where the set of model states are selected based on a validation performance of the set of model states performed during the training. The computing device 205 may input the training data 220 to the machine learning model 225 throughout multiple iterations. The computing device 205 may calculate a validation performance value for each iteration. As depicted in the example of FIG. 2, the computing device 205 may train a first machine learning model 245, a second machine learning model 250, and a third machine learning model 255. The computing device 205 may determine that the state S3 for the first machine learning model 245, the state S2 for the second machine learning model 250, and the state S3 for the third machine learning model 255 correspond to the highest validation performance scores for each machine learning model. The computing device 205 may thus use the state S3 for the first machine learning model 245, the state S2 for the second machine learning model 250, and the state S3 for the third machine learning model 255 for generating an ensembled machine learning model 230.

As depicted herein, the computing device 205 generates an ensembled machine learning model to handle domain generalization settings. In some examples, a framework for evaluation in the domain generalization setting which accounts for randomness due to seed and hyperparameter values, and recommend reporting the average test accuracy over all the runs computed using a model selection criteria. It may be desirable to have a single predictor that has a high accuracy. Ensembles combine predictions from multiple models by exploiting function diversity. However, simple ensembles may suffer from instability in the domain generalization setting. Building on the observations discussed herein, the computing device 205 may generate an ensemble of moving average models. In some examples, the computing device 205 may determine an experiment with ensemble of multiple independently trained models (i.e., with different hyper-parameters and seeds). When each of these models are moving average models from their corresponding runs, this ensemble may be referred to as the ensemble of averages. The computing device 205 may predict the class 9 predicted by an ensemble of averages for an input x is according to the formula:

$$\hat{y} = \operatorname{argmax}_k Softmax\left(\frac{1}{E}\sum_{i=1}^{E} f_{\hat{\theta}_i}(x)\right)^{(k)}$$

where E is the total number of models in the ensemble, $\hat{\theta}_L$ denotes the parameters of the ith moving average model, and the super-script $(\cdot)^{(k)}$ denotes the kth element of the vector argument. Finally, the state $\hat{\theta}_t$ of the ith moving average model used in the ensemble may be selected from its corresponding run using its in-domain validation set performance.

The computing device 205 may then perform a machine learning prediction using the ensembled machine learning model on a second data set associated with a second domain different from the first domain. An output of the ensembled machine learning model may be or otherwise include a dimension-wise average of respective outputs from the set of machine learning models in the ensembled machine learning model. Thus, the computing device 205 may input the test data to the set of machine learning models are the selected model states (e.g., the state S3 for the first machine learning model 245, the state S2 for the second machine learning model 250, and the state S3 for the third machine learning model 255). The computing device 205 may then perform an average of the outputs from each model to generate a final prediction. The computing device 205 may indicate the final prediction in results 235 to the user device 210.

Techniques depicted herein may be implemented to illustrate that instead of ensembling unaveraged models, ensembling moving average models from different runs increases stability and further boosts performance. In one examples, when using a ResNet-50 pre-trained on a first dataset having 4 domains, 7 classes, and 9,991 images, this ensemble of averages may achieve 88.6% accuracy on the first dataset, 79.1% on the third dataset having 4 domains, 5 classes, and 10,729 images, 72.5% on the fourth dataset having 4 domains, 65 classes, and 15,588 images, 52.3% on the second dataset, and 47.4% on the fifth dataset having 4 domains, 10 classes, and 24,788 images, an average of 68.0% (which is more than empirical risk minimization (ERM) algorithm without model averaging by 4%). For a model that is pre-trained on a larger dataset, the ensemble of averages achieve an average accuracy of 72.7%, which is greater than its corresponding ERM baseline by 5%.

Comparing ERM over different datasets, they may perform similarly with a smaller hyper-parameter space. A comparison between stochastic weighted averaging densely (SWAD) and ERM with model average may indicate similar performance. However, ensemble of averages protocol retains the advantage of not tuning any hyper-parameters while SWAD has 3 additional ones to be tuned separately in addition to the optimization hyper-parameters. Finally, the ensemble of averages may outperform all existing results: ERM by 4% and SWAD by 1:1%, while non-ensemble models may report the average test accuracy of multiple models, the test accuracy for ensemble of averages may be achieved by a single predictor that combines the output of multiple models.

Figure 3:
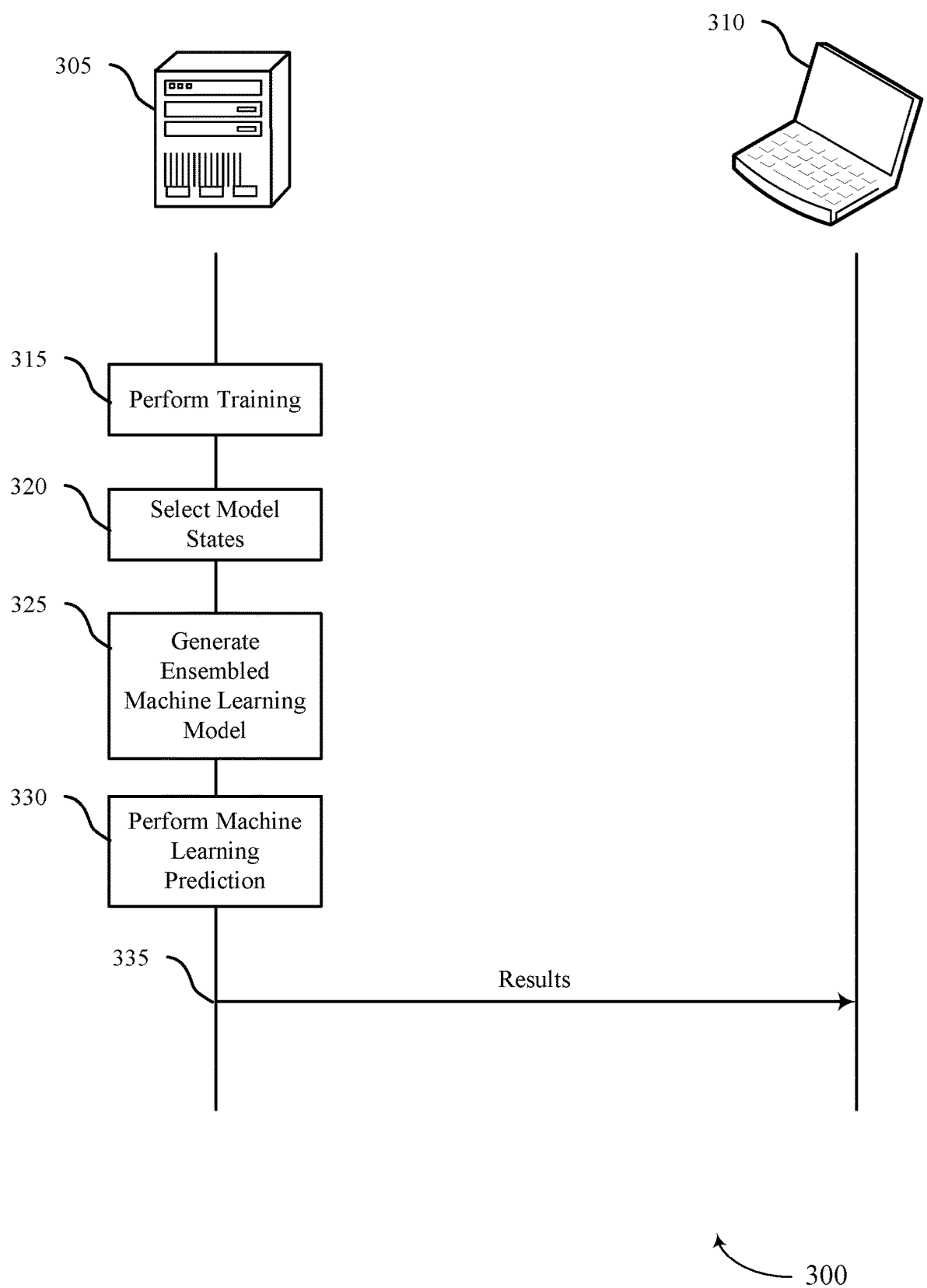
FIG. 3 illustrates an example of a process flow that supports techniques for machine learning model selection for domain generalization in accordance with aspects of the present disclosure.

FIG. 3 illustrates an example of a process flow 300 that supports techniques for machine learning model selection for domain generalization in accordance with aspects of the present disclosure. The process flow 300 may be implemented by a system including one or more computing devices 305 and one or more user devices 310. The computing device 305 may host a platform for generating an ensembles machine learning model. The user device 310 may include user interfaces that can display information corresponding to the results of the ensembled machine learning model, as described herein with reference to FIGS. 1 through 2. Alternative examples of the following may be implemented, where some processes are performed in a different order than described or are not performed at all. In some examples, processes may include additional features not mentioned below, or further processes may be added. Additionally or alternatively, operations described herein with reference to the computing device 305 may instead be performed by the user device 310.

In some examples, at 315, the computing device 305 may perform training of a set of machine learning models on a first data set associated with a first domain. In some examples, the set of machine learning models may include respective sets of parameters that are updated across a plurality of iterations during the training. The training may include, for each machine learning model of the set of machine learning models, inputting, as values for a set of parameters of the respective sets of parameters and for an iteration of the set of iterations, a moving average of the set of parameters calculated over a threshold number of previous iterations.

The computing device 305 may start a calculation of the moving average of the set of parameters after a configured number of iterations from a starting iteration of the set of iterations. In some cases, the set of machine learning models may be trained using a gradient based technique.

At 320, the computing device 305 may select a set of model states that a generated during the training of the set of machine learning models. In some examples, the set of model states may be selected based on a validation performance of the set of model states performed during the training. In some examples, the computing device 305 may determine, for a first iteration, a first validation performance value associated with a first state of a machine learning model of the set of machine learning models. The computing device 305 may determine, for a second iteration following the first iteration, a second validation performance value associated with a second state of the machine learning model of the set of machine learning models. In some examples, the computing device 305 may select the first state of the machine learning model for generation of the ensembled machine learning model based on determining that the second validation performance value is less than the first validation performance value.

At 325, the computing device 305 may generate an ensembled machine learning model by aggregating the plurality of machine learning models corresponding to the set of selected model states. At 330, the computing device 305 may perform a machine learning prediction using the ensembled machine learning model on a second data set associated with a second domain different from the first domain. In some examples, an output of the ensembled machine learning model may be a dimension-wise average of respective outputs from the set of machine learning models in the ensembled machine learning model. The respective outputs from the set of machine learning models may include a respective vector for each machine learning model and the output of the ensembled machine learning model may include the dimension-wise average of the respective vector.

Figure 4:
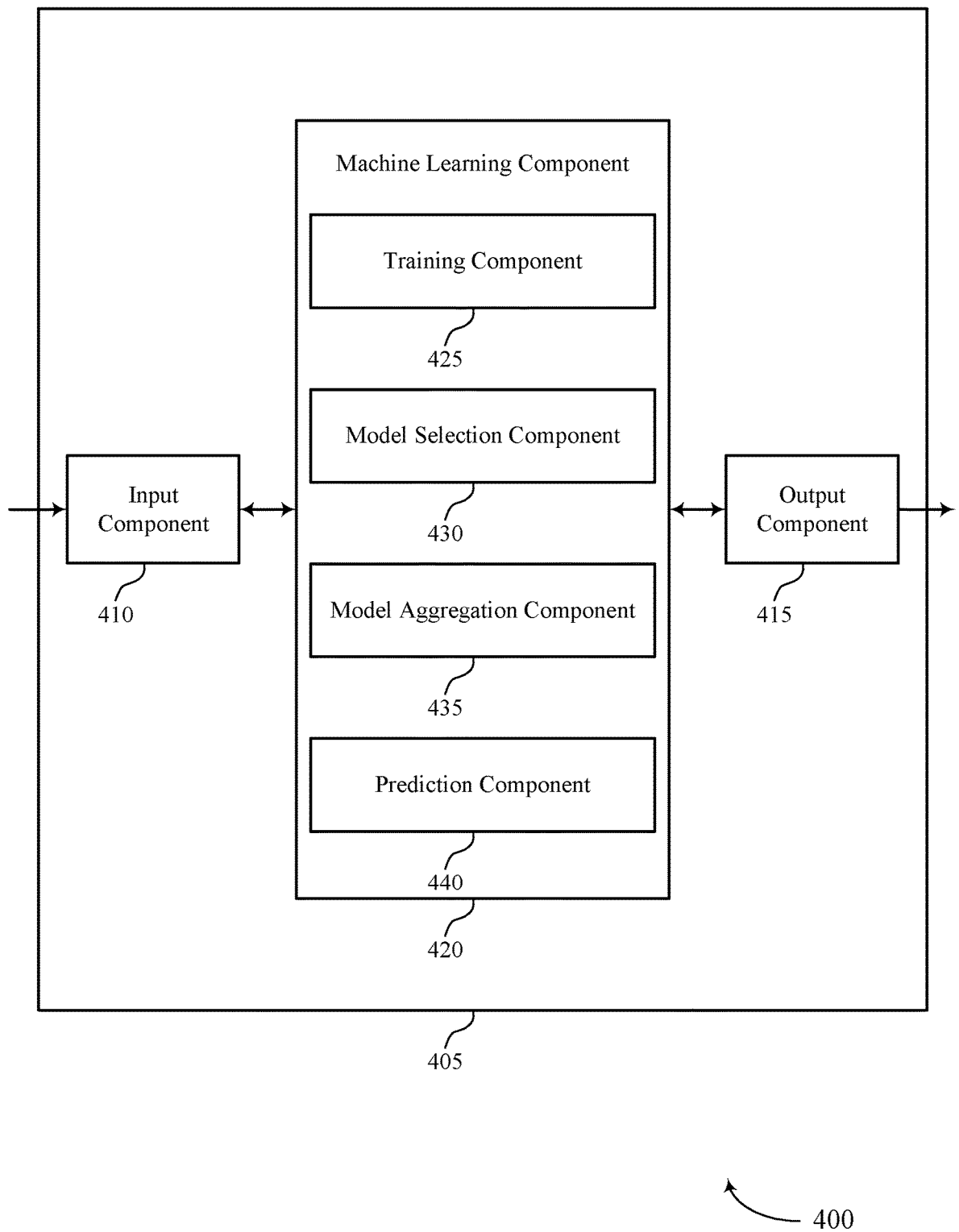
FIG. 4 shows a block diagram of an apparatus that supports techniques for machine learning model selection for domain generalization in accordance with aspects of the present disclosure.

FIG. 4 shows a block diagram 400 of a device 405 that supports techniques for machine learning model selection for domain generalization in accordance with aspects of the present disclosure. The device 405 may include an input component 410, an output component 415, and a machine learning component 420. The device 405 may also include a processor. Each of these components may be in communication with one another (e.g., via one or more buses).

The input component 410 may manage input signals for the apparatus 405. For example, the input component 410 may identify input signals based on an interaction with a modem, a keyboard, a mouse, a touchscreen, or a similar device. These input signals may be associated with user input or processing at other components or devices. In some cases, the input component 410 may utilize an operating system such as iOS®, ANDROID®, MS-DOS®, MS-WINDOWS®, OS/2®, UNIX®, LINUX®, or another known operating system to handle input signals. The input component 410 may send aspects of these input signals to other components of the apparatus 405 for processing. For example, the input component 410 may transmit input signals to the machine learning component 420 to support techniques for machine learning model selection for domain generalization. In some cases, the input component 410 may be a component of an I/O controller 610 as described with reference to FIG. 6.

The output component 415 may manage output signals for the apparatus 405. For example, the output component 415 may receive signals from other components of the apparatus 405, such as the machine learning component 420, and may transmit these signals to other components or devices. In some specific examples, the output component 415 may transmit output signals for display in a user interface, for storage in a database or data store, for further processing at a server or server cluster, or for any other processes at any number of devices or systems. In some cases, the output component 415 may be a component of an I/O controller 610 as described with reference to FIG. 6.

For example, the machine learning component 420 may include a training component 425, a model selection component 430, a model aggregation component 435, a prediction component 440, or any combination thereof. In some examples, the machine learning component 420, or various components thereof, may be configured to perform various operations (e.g., receiving, monitoring, transmitting) using or otherwise in cooperation with the input component 410, the output component 415, or both. For example, the machine learning component 420 may receive information from the input component 410, send information to the output component 415, or be integrated in combination with the input component 410, the output component 415, or both to receive information, transmit information, or perform various other operations as described herein.

The machine learning component 420 may support machine learning model training in accordance with examples as disclosed herein. The training component 425 may be configured as or otherwise support a means for performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The model selection component 430 may be configured as or otherwise support a means for selecting a set of multiple model states that are generated during the training of the set of multiple machine learning models, where the set of multiple model states are selected based on a validation performance of the set of multiple model states performed during the training. The model aggregation component 435 may be configured as or otherwise support a means for generating an ensembled machine learning model by aggregating the set of multiple machine learning models corresponding to the set of multiple selected model states. The prediction component 440 may be configured as or otherwise support a means for performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

Figure 5:
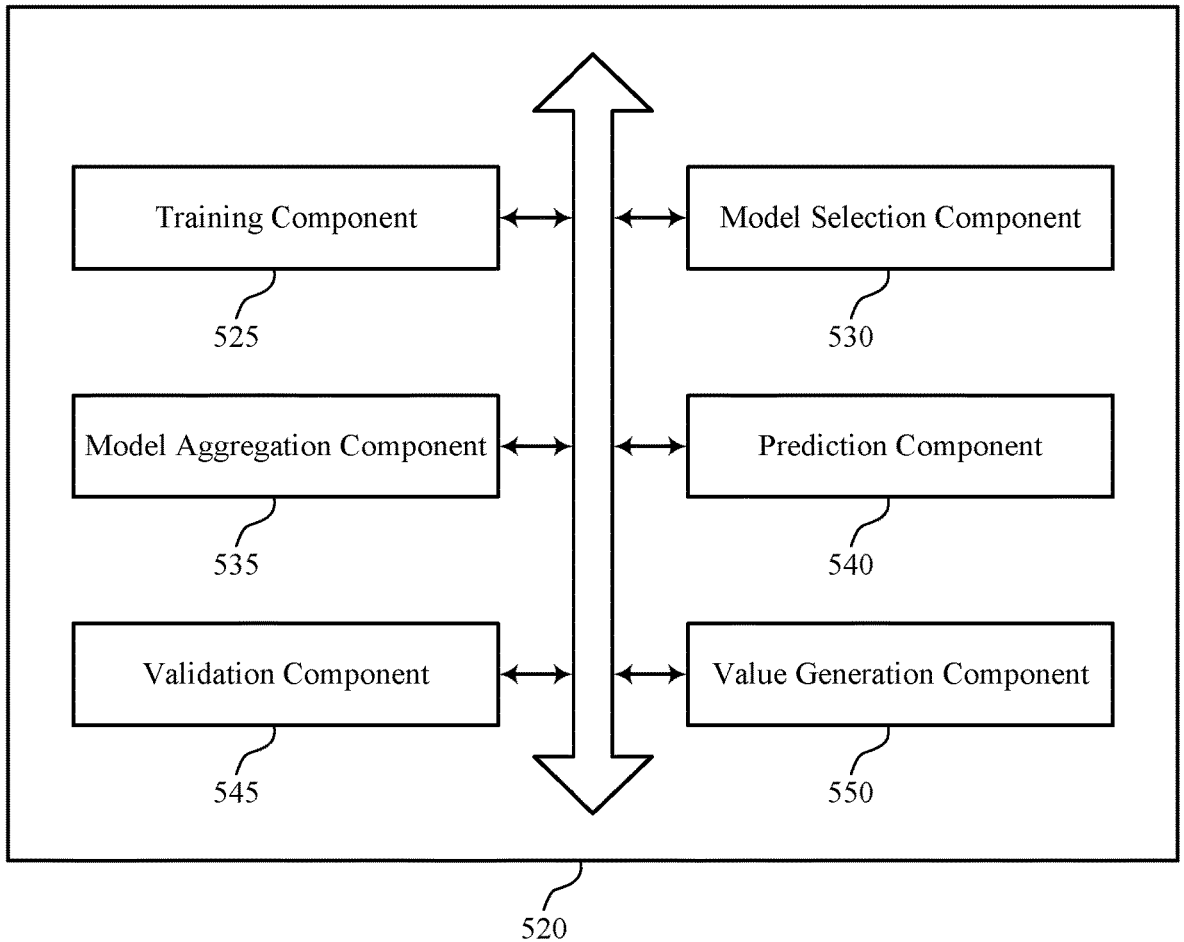
FIG. 5 shows a block diagram of a machine learning component that supports techniques for machine learning model selection for domain generalization in accordance with aspects of the present disclosure.

FIG. 5 shows a block diagram 500 of a machine learning component 520 that supports techniques for machine learning model selection for domain generalization in accordance with aspects of the present disclosure. The machine learning component 520 may be an example of aspects of a machine learning component or a machine learning component 420, or both, as described herein. The machine learning component 520, or various components thereof, may be an example of means for performing various aspects of techniques for machine learning model selection for domain generalization as described herein. For example, the machine learning component 520 may include a training component 525, a model selection component 530, a model aggregation component 535, a prediction component 540, a validation component 545, a value generation component 550, or any combination thereof. Each of these components may communicate, directly or indirectly, with one another (e.g., via one or more buses).

The machine learning component 520 may support machine learning model training in accordance with examples as disclosed herein. The training component 525 may be configured as or otherwise support a means for performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The model selection component 530 may be configured as or otherwise support a means for selecting a set of multiple model states that are generated during the training of the set of multiple machine learning models, where the set of multiple model states are selected based on a validation performance of the set of multiple model states performed during the training. The model aggregation component 535 may be configured as or otherwise support a means for generating an ensembled machine learning model by aggregating the set of multiple machine learning models corresponding to the set of multiple selected model states. The prediction component 540 may be configured as or otherwise support a means for performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

In some examples, the validation component 545 may be configured as or otherwise support a means for determining, for one or more iterations of the set of multiple iterations, a validation performance value associated with a current state of a machine learning model of the set of multiple machine learning models. In some examples, the model selection component 530 may be configured as or otherwise support a means for selecting a model state for one or more machine learning models of the set of multiple machine learning models based on a highest validation performance value for the corresponding machine learning model across all iterations of the set of multiple iterations.

In some examples, the value generation component 550 may be configured as or otherwise support a means for determining, for a first iteration following the threshold number of previous iterations, a first set of values for the set of parameters of a machine learning model of the set of multiple machine learning models. In some examples, the value generation component 550 may be configured as or otherwise support a means for determining, for a second iteration following the first iteration, a second set of values for the set of parameters of the machine learning model based on the moving average of the set of parameters calculated during the first iteration.

In some examples, the training component 525 may be configured as or otherwise support a means for starting a calculation of the moving average of the set of parameters after a configured number of iterations from a starting iteration of the set of multiple iterations.

In some examples, the validation component 545 may be configured as or otherwise support a means for determining, for a first iteration, a first validation performance value associated with a first state of a machine learning model of the set of multiple machine learning models. In some examples, the validation component 545 may be configured as or otherwise support a means for determining, for a second iteration following the first iteration, a second validation performance value associated with a second state of the machine learning model of the set of multiple machine learning models. In some examples, the model selection component 530 may be configured as or otherwise support a means for selecting the first state of the machine learning model for generation of the ensembled machine learning model based on determining that the second validation performance value is less than the first validation performance value.

In some examples, the set of multiple machine learning models are trained using a gradient based technique. In some examples, the respective outputs from the set of multiple machine learning models includes a respective vector for each machine learning model and the output of the ensembled machine learning model includes the dimension-wise average of the respective vector.

Figure 6:
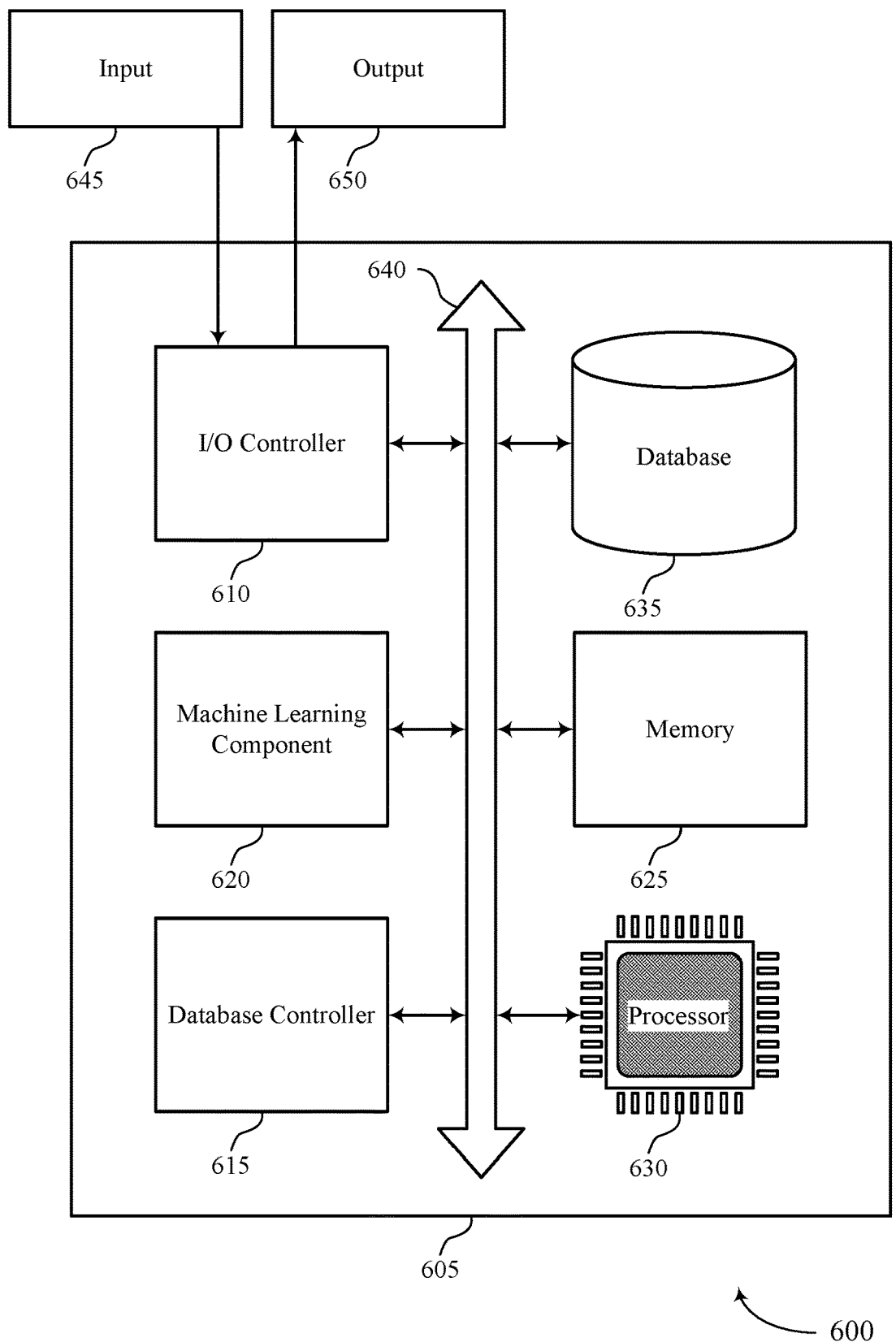
FIG. 6 shows a diagram of a system including a device that supports techniques for machine learning model selection for domain generalization in accordance with aspects of the present disclosure.

FIG. 6 shows a diagram of a system 600 including a device 605 that supports techniques for machine learning model selection for domain generalization in accordance with aspects of the present disclosure. The device 605 may be an example of or include the components of a device 405 as described herein. The device 605 may include components for bi-directional data communications including components for transmitting and receiving communications, such as a machine learning component 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some cases, the I/O controller 610 may be implemented as part of a processor. In some examples, a user may interact with the device 605 via the I/O controller 610 or via hardware components controlled by the I/O controller 610.

The database controller 615 may manage data storage and processing in a database 635. The database 635 may be external to the device 605, temporarily or permanently connected to the device 605, or a data storage component of the device 605. In some cases, a user may interact with the database controller 615. In some other cases, the database controller 615 may operate automatically without user interaction. The database 635 may be an example of a persistent data store, a single database, a distributed database, multiple distributed databases, a database management system, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting techniques for machine learning model selection for domain generalization).

The machine learning component 620 may support machine learning model training in accordance with examples as disclosed herein. For example, the machine learning component 620 may be configured as or otherwise support a means for performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The machine learning component 620 may be configured as or otherwise support a means for selecting a set of multiple model states that are generated during the training of the set of multiple machine learning models, where the set of multiple model states are selected based on a validation performance of the set of multiple model states performed during the training. The machine learning component 620 may be configured as or otherwise support a means for generating an ensembled machine learning model by aggregating the set of multiple machine learning models corresponding to the set of multiple selected model states. The machine learning component 620 may be configured as or otherwise support a means for performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

By including or configuring the machine learning component 620 in accordance with examples as described herein, the device 605 may support techniques for boosting domain generalization and diminishing the impact of stochasticity by improving the rank correlation between the in-domain validation accuracy and out-domain test accuracy, which may be utilized for reliable model selection.

Figure 7:
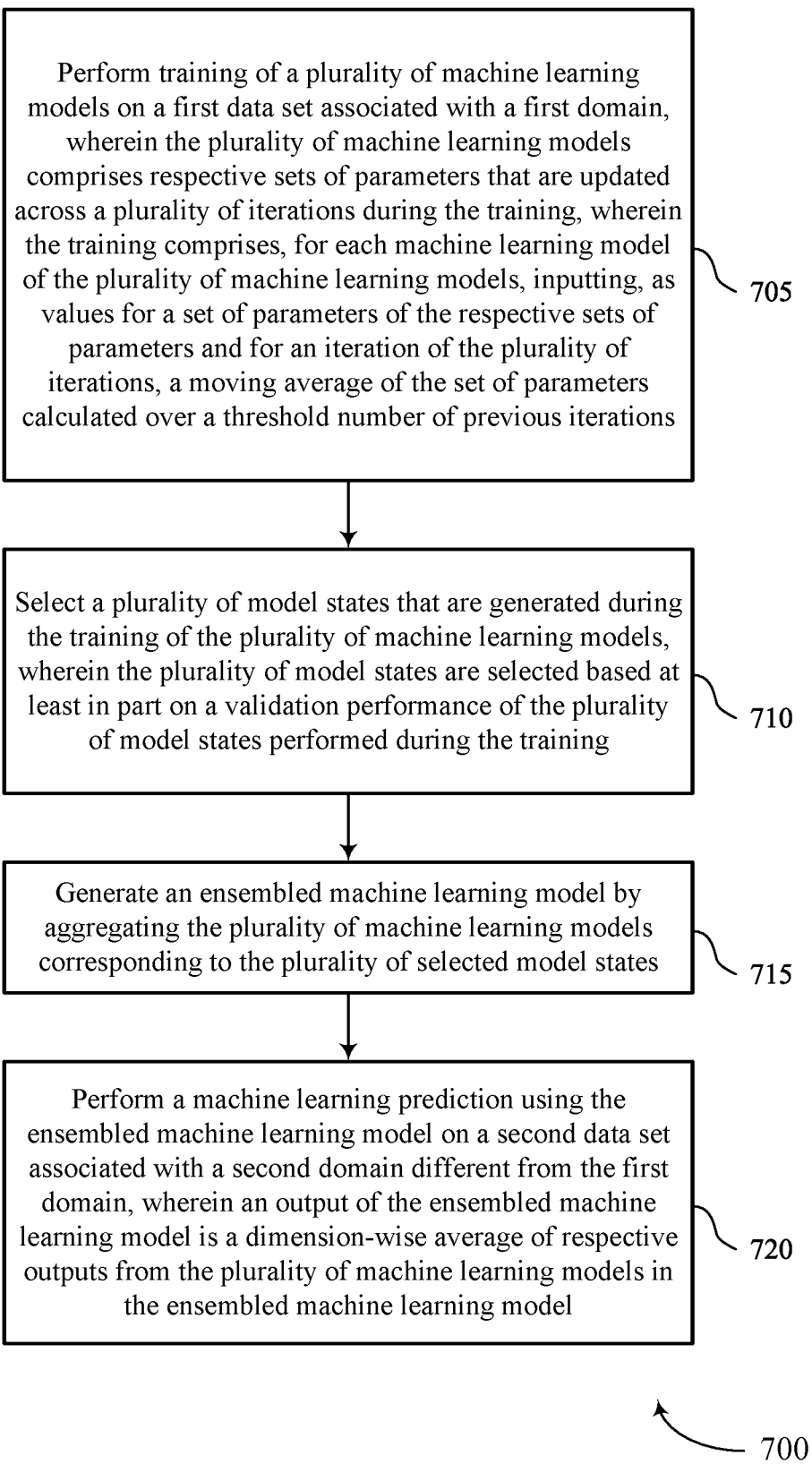
FIGS. 7 through 10 show flowcharts illustrating methods that support techniques for machine learning model selection for domain generalization in accordance with aspects of the present disclosure.

FIG. 7 shows a flowchart illustrating a method 700 that supports techniques for machine learning model selection for domain generalization in accordance with aspects of the present disclosure. The operations of the method 700 may be implemented by a computing device or its components as described herein. For example, the operations of the method 700 may be performed by a computing device as described with reference to FIGS. 1 through 6. In some examples, a computing device may execute a set of instructions to control the functional elements of the computing device to perform the described functions. Additionally, or alternatively, the computing device may perform aspects of the described functions using special-purpose hardware.

At 705, the method may include performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The operations of 705 may be performed in accordance with examples as disclosed herein. In some examples, aspects of the operations of 705 may be performed by a training component 525 as described with reference to FIG. 5.

At 710, the method may include selecting a set of multiple model states that are generated during the training of the set of multiple machine learning models, where the set of multiple model states are selected based on a validation performance of the set of multiple model states performed during the training. The operations of 710 may be performed in accordance with examples as disclosed herein. In some examples, aspects of the operations of 710 may be performed by a model selection component 530 as described with reference to FIG. 5.

At 715, the method may include generating an ensembled machine learning model by aggregating the set of multiple machine learning models corresponding to the set of multiple selected model states. The operations of 715 may be performed in accordance with examples as disclosed herein. In some examples, aspects of the operations of 715 may be performed by a model aggregation component 535 as described with reference to FIG. 5.

At 720, the method may include performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model. The operations of 720 may be performed in accordance with examples as disclosed herein. In some examples, aspects of the operations of 720 may be performed by a prediction component 540 as described with reference to FIG. 5.

Figure 8:
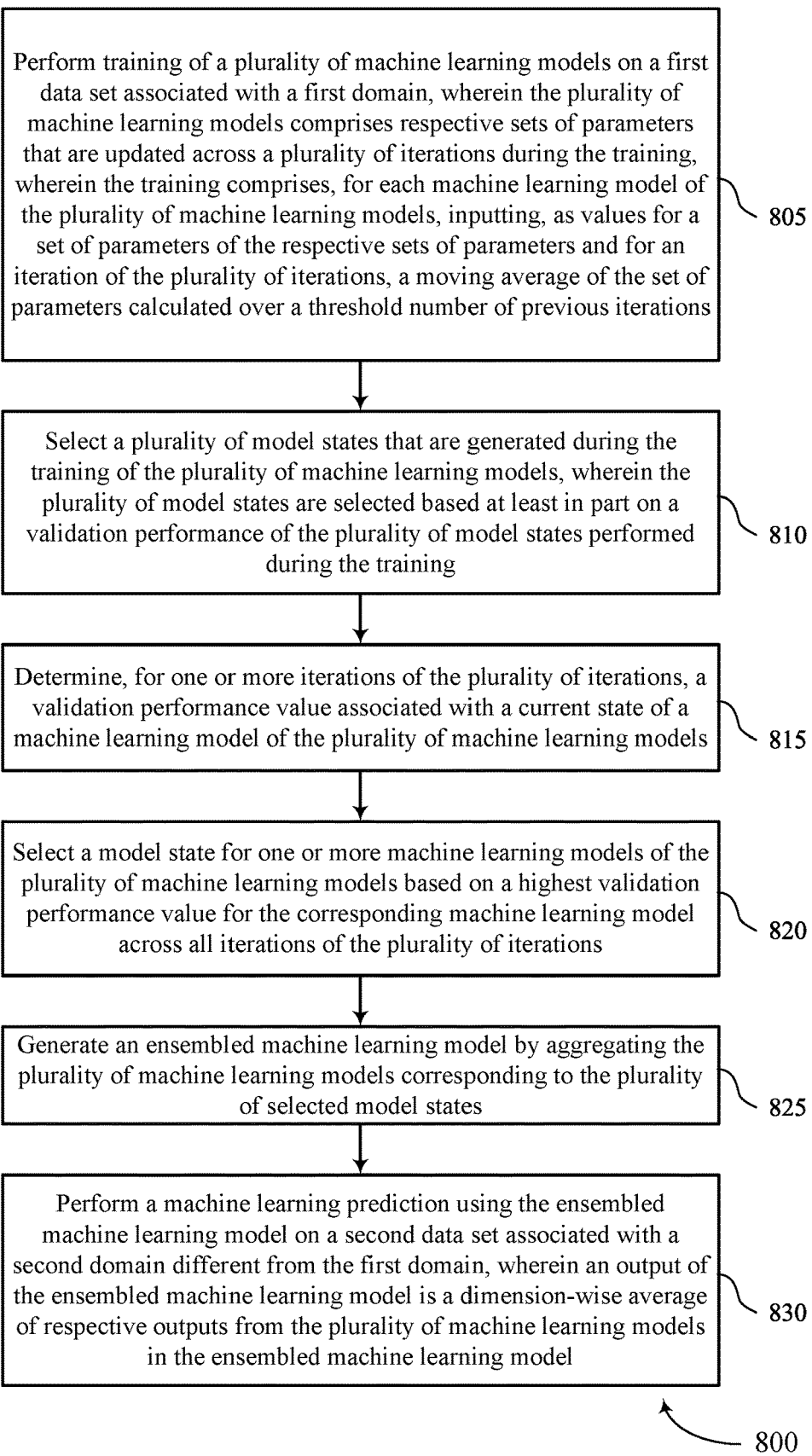

FIG. 8 shows a flowchart illustrating a method 800 that supports techniques for machine learning model selection for domain generalization in accordance with aspects of the present disclosure. The operations of the method 800 may be implemented by a computing device or its components as described herein. For example, the operations of the method 800 may be performed by a computing device as described with reference to FIGS. 1 through 6. In some examples, a computing device may execute a set of instructions to control the functional elements of the computing device to perform the described functions. Additionally, or alternatively, the computing device may perform aspects of the described functions using special-purpose hardware.

At 805, the method may include performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The operations of 805 may be performed in accordance with examples as disclosed herein. In some examples, aspects of the operations of 805 may be performed by a training component 525 as described with reference to FIG. 5.

At 810, the method may include selecting a set of multiple model states that are generated during the training of the set of multiple machine learning models, where the set of multiple model states are selected based on a validation performance of the set of multiple model states performed during the training. The operations of 810 may be performed in accordance with examples as disclosed herein. In some examples, aspects of the operations of 810 may be performed by a model selection component 530 as described with reference to FIG. 5.

At 815, the method may include determining, for one or more iterations of the set of multiple iterations, a validation performance value associated with a current state of a machine learning model of the set of multiple machine learning models. The operations of 815 may be performed in accordance with examples as disclosed herein. In some examples, aspects of the operations of 815 may be performed by a validation component 545 as described with reference to FIG. 5.

At 820, the method may include selecting a model state for one or more machine learning models of the set of multiple machine learning models based on a highest validation performance value for the corresponding machine learning model across all iterations of the set of multiple iterations. The operations of 820 may be performed in accordance with examples as disclosed herein. In some examples, aspects of the operations of 820 may be performed by a model selection component 530 as described with reference to FIG. 5.

At 825, the method may include generating an ensembled machine learning model by aggregating the set of multiple machine learning models corresponding to the set of multiple selected model states. The operations of 825 may be performed in accordance with examples as disclosed herein. In some examples, aspects of the operations of 825 may be performed by a model aggregation component 535 as described with reference to FIG. 5.

At 830, the method may include performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model. The operations of 830 may be performed in accordance with examples as disclosed herein. In some examples, aspects of the operations of 830 may be performed by a prediction component 540 as described with reference to FIG. 5.

Figure 9:
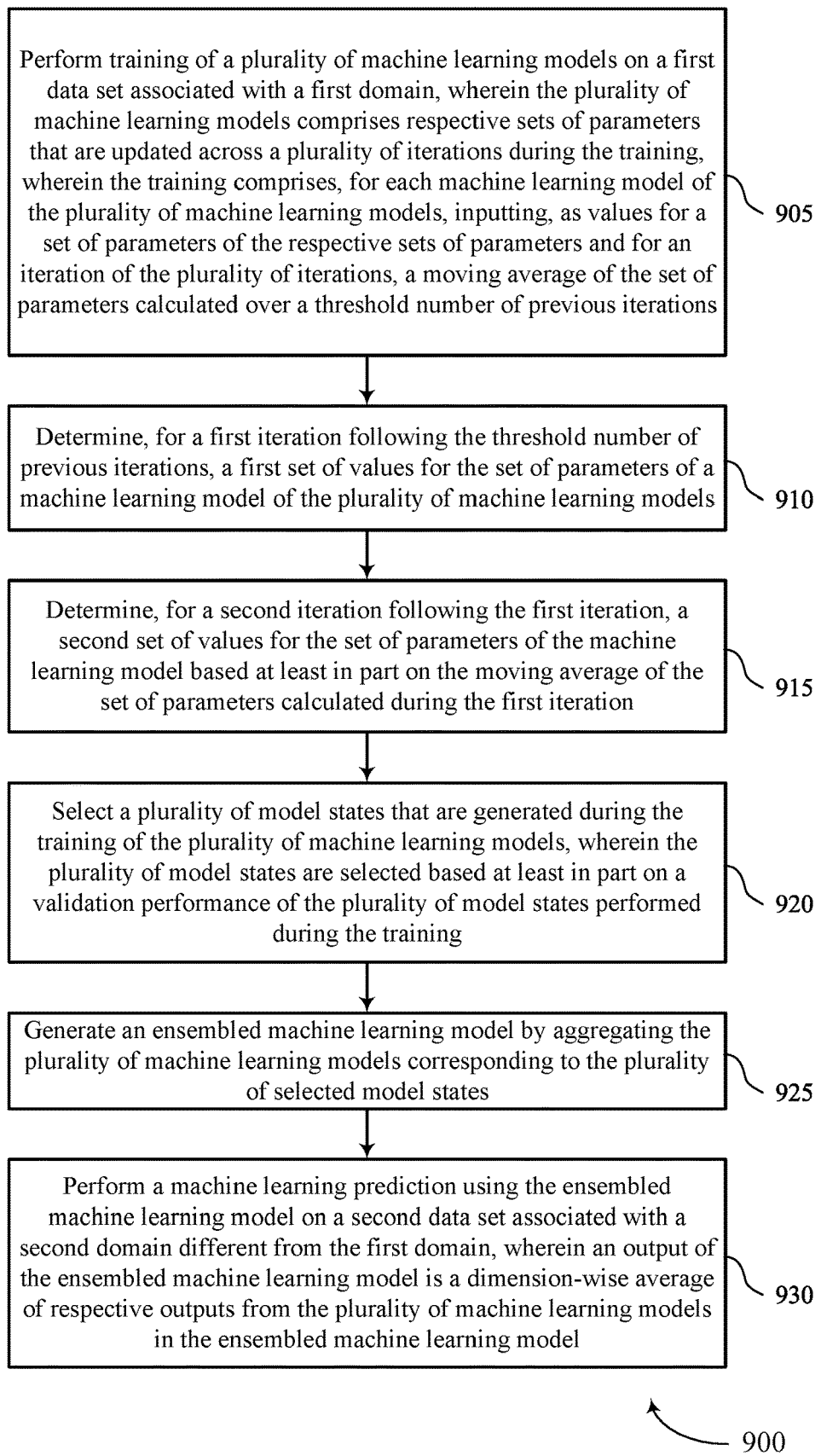

FIG. 9 shows a flowchart illustrating a method 900 that supports techniques for machine learning model selection for domain generalization in accordance with aspects of the present disclosure. The operations of the method 900 may be implemented by a computing device or its components as described herein. For example, the operations of the method 900 may be performed by a computing device as described with reference to FIGS. 1 through 6. In some examples, a computing device may execute a set of instructions to control the functional elements of the computing device to perform the described functions. Additionally, or alternatively, the computing device may perform aspects of the described functions using special-purpose hardware.

At 905, the method may include performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The operations of 905 may be performed in accordance with examples as disclosed herein. In some examples, aspects of the operations of 905 may be performed by a training component 525 as described with reference to FIG. 5.

At 910, the method may include determining, for a first iteration following the threshold number of previous iterations, a first set of values for the set of parameters of a machine learning model of the set of multiple machine learning models. The operations of 910 may be performed in accordance with examples as disclosed herein. In some examples, aspects of the operations of 910 may be performed by a value generation component 550 as described with reference to FIG. 5.

At 915, the method may include determining, for a second iteration following the first iteration, a second set of values for the set of parameters of the machine learning model based on the moving average of the set of parameters calculated during the first iteration. The operations of 915 may be performed in accordance with examples as disclosed herein. In some examples, aspects of the operations of 915 may be performed by a value generation component 550 as described with reference to FIG. 5.

At 920, the method may include selecting a set of multiple model states that are generated during the training of the set of multiple machine learning models, where the set of multiple model states are selected based on a validation performance of the set of multiple model states performed during the training. The operations of 920 may be performed in accordance with examples as disclosed herein. In some examples, aspects of the operations of 920 may be performed by a model selection component 530 as described with reference to FIG. 5.

At 925, the method may include generating an ensembled machine learning model by aggregating the set of multiple machine learning models corresponding to the set of multiple selected model states. The operations of 925 may be performed in accordance with examples as disclosed herein. In some examples, aspects of the operations of 925 may be performed by a model aggregation component 535 as described with reference to FIG. 5.

At 930, the method may include performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model. The operations of 930 may be performed in accordance with examples as disclosed herein. In some examples, aspects of the operations of 930 may be performed by a prediction component 540 as described with reference to FIG. 5.

Figure 10:
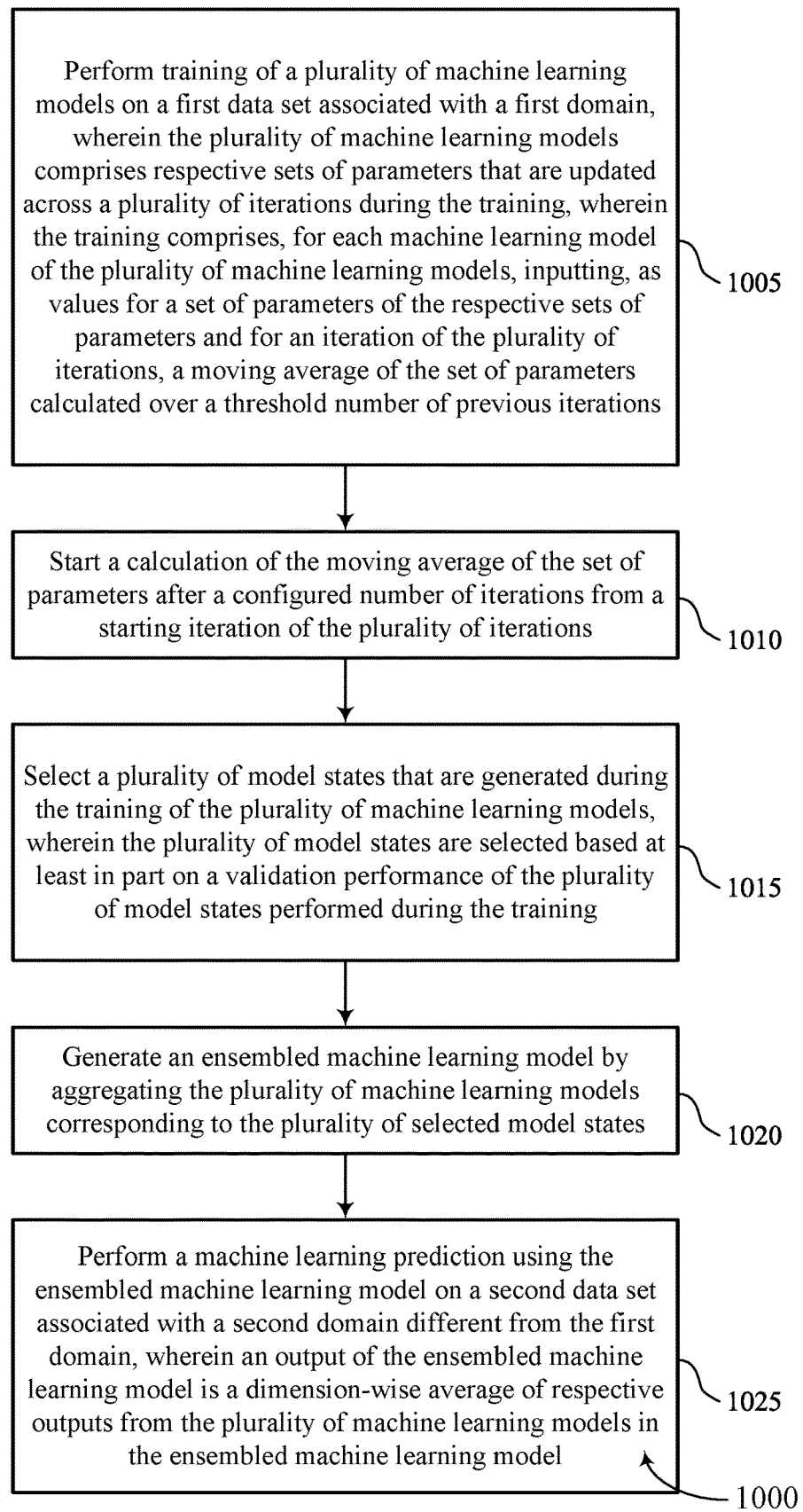

FIG. 10 shows a flowchart illustrating a method 1000 that supports techniques for machine learning model selection for domain generalization in accordance with aspects of the present disclosure. The operations of the method 1000 may be implemented by a computing device or its components as described herein. For example, the operations of the method 1000 may be performed by a computing device as described with reference to FIGS. 1 through 6. In some examples, a computing device may execute a set of instructions to control the functional elements of the computing device to perform the described functions. Additionally, or alternatively, the computing device may perform aspects of the described functions using special-purpose hardware.

At 1005, the method may include performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations. The operations of 1005 may be performed in accordance with examples as disclosed herein. In some examples, aspects of the operations of 1005 may be performed by a training component 525 as described with reference to FIG. 5.

At 1010, the method may include starting a calculation of the moving average of the set of parameters after a configured number of iterations from a starting iteration of the set of multiple iterations. The operations of 1010 may be performed in accordance with examples as disclosed herein. In some examples, aspects of the operations of 1010 may be performed by a training component 525 as described with reference to FIG. 5.

At 1015, the method may include selecting a set of multiple model states that are generated during the training of the set of multiple machine learning models, where the set of multiple model states are selected based on a validation performance of the set of multiple model states performed during the training. The operations of 1015 may be performed in accordance with examples as disclosed herein. In some examples, aspects of the operations of 1015 may be performed by a model selection component 530 as described with reference to FIG. 5.

At 1020, the method may include generating an ensembled machine learning model by aggregating the set of multiple machine learning models corresponding to the set of multiple selected model states. The operations of 1020 may be performed in accordance with examples as disclosed herein. In some examples, aspects of the operations of 1020 may be performed by a model aggregation component 535 as described with reference to FIG. 5.

At 1025, the method may include performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model. The operations of 1025 may be performed in accordance with examples as disclosed herein. In some examples, aspects of the operations of 1025 may be performed by a prediction component 540 as described with reference to FIG. 5.

A method for machine learning model training is described. The method may include performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations, selecting a set of multiple model states that are generated during the training of the set of multiple machine learning models, where the set of multiple model states are selected based on a validation performance of the set of multiple model states performed during the training, generating an ensembled machine learning model by aggregating the set of multiple machine learning models corresponding to the set of multiple selected model states, and performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

An apparatus for machine learning model training is described. The apparatus may include a processor, memory coupled with the processor, and instructions stored in the memory. The instructions may be executable by the processor to cause the apparatus to perform training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations, select a set of multiple model states that are generated during the training of the set of multiple machine learning models, where the set of multiple model states are selected based on a validation performance of the set of multiple model states performed during the training, generate an ensembled machine learning model by aggregating the set of multiple machine learning models corresponding to the set of multiple selected model states, and perform a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

Another apparatus for machine learning model training is described. The apparatus may include means for performing training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations, means for selecting a set of multiple model states that are generated during the training of the set of multiple machine learning models, where the set of multiple model states are selected based on a validation performance of the set of multiple model states performed during the training, means for generating an ensembled machine learning model by aggregating the set of multiple machine learning models corresponding to the set of multiple selected model states, and means for performing a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

A non-transitory computer-readable medium storing code for machine learning model training is described. The code may include instructions executable by a processor to perform training of a set of multiple machine learning models on a first data set associated with a first domain, where the set of multiple machine learning models includes respective sets of parameters that are updated across a set of multiple iterations during the training, where the training includes, for each machine learning model of the set of multiple machine learning models, inputting, as values for a set of parameters of the respective sets of parameters and for an iteration of the set of multiple iterations, a moving average of the set of parameters calculated over a threshold number of previous iterations, select a set of multiple model states that are generated during the training of the set of multiple machine learning models, where the set of multiple model states are selected based on a validation performance of the set of multiple model states performed during the training, generate an ensembled machine learning model by aggregating the set of multiple machine learning models corresponding to the set of multiple selected model states, and perform a machine learning prediction using the ensembled machine learning model on a second data set associated with a second domain different from the first domain, where an output of the ensembled machine learning model is a dimension-wise average of respective outputs from the set of multiple machine learning models in the ensembled machine learning model.

Some examples of the method, apparatuses, and non-transitory computer-readable medium described herein may further include operations, features, means, or instructions for determining, for one or more iterations of the set of multiple iterations, a validation performance value associated with a current state of a machine learning model of the set of multiple machine learning models and selecting a model state for one or more machine learning models of the set of multiple machine learning models based on a highest validation performance value for the corresponding machine learning model across all iterations of the set of multiple iterations.

Some examples of the method, apparatuses, and non-transitory computer-readable medium described herein may further include operations, features, means, or instructions for determining, for a first iteration following the threshold number of previous iterations, a first set of values for the set of parameters of a machine learning model of the set of multiple machine learning models and determining, for a second iteration following the first iteration, a second set of values for the set of parameters of the machine learning model based on the moving average of the set of parameters calculated during the first iteration.

Some examples of the method, apparatuses, and non-transitory computer-readable medium described herein may further include operations, features, means, or instructions for starting a calculation of the moving average of the set of parameters after a configured number of iterations from a starting iteration of the set of multiple iterations.

Some examples of the method, apparatuses, and non-transitory computer-readable medium described herein may further include operations, features, means, or instructions for determining, for a first iteration, a first validation performance value associated with a first state of a machine learning model of the set of multiple machine learning models, determining, for a second iteration following the first iteration, a second validation performance value associated with a second state of the machine learning model of the set of multiple machine learning models, and selecting the first state of the machine learning model for generation of the ensembled machine learning model based on determining that the second validation performance value may be less than the first validation performance value.

In some examples of the method, apparatuses, and non-transitory computer-readable medium described herein, the set of multiple machine learning models may be trained using a gradient based technique. In some examples of the method, apparatuses, and non-transitory computer-readable medium described herein, the respective outputs from the set of multiple machine learning models includes a respective vector for each machine learning model and the output of the ensembled machine learning model includes the dimension-wise average of the respective vector.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for machine learning model training, comprising:
    performing training of a plurality of machine learning models on a first data set associated with a first domain, wherein the plurality of machine learning models comprises respective sets of parameters that are updated across a plurality of iterations during the training, wherein the training comprises, for each machine learning model of the plurality of machine learning models, inputting, as values for a set of parameters of the respective sets of parameters and for an iteration of the plurality of iterations, a moving average of the set of parameters calculated over a threshold number of previous iterations;
    selecting a plurality of model states that are generated during the training of the plurality of machine learning models, wherein the plurality of model states are selected based at least in part on a validation performance of the plurality of model states performed during the training;
    generating an ensembled machine learning model by aggregating the plurality of machine learning models corresponding to the plurality of selected model states; and
    performing a machine learning prediction using the ensembled machine learning model on a second data set associated with a second domain different from the first domain, wherein an output of the ensembled machine learning model is a dimension-wise average of respective outputs from the plurality of machine learning models in the ensembled machine learning model.

2. The method of claim 1, further comprising:
    determining, for one or more iterations of the plurality of iterations, a validation performance value associated with a current state of a machine learning model of the plurality of machine learning models; and
    selecting a model state for one or more machine learning models of the plurality of machine learning models based on a highest validation performance value for the corresponding machine learning model across all iterations of the plurality of iterations.

3. The method of claim 1, further comprising:
    determining, for a first iteration following the threshold number of previous iterations, a first set of values for the set of parameters of a machine learning model of the plurality of machine learning models; and
    determining, for a second iteration following the first iteration, a second set of values for the set of parameters of the machine learning model based at least in part on the moving average of the set of parameters calculated during the first iteration.

4. The method of claim 1, further comprising:
    starting a calculation of the moving average of the set of parameters after a configured number of iterations from a starting iteration of the plurality of iterations.

5. The method of claim 1, further comprising:
    determining, for a first iteration, a first validation performance value associated with a first state of a machine learning model of the plurality of machine learning models;
    determining, for a second iteration following the first iteration, a second validation performance value associated with a second state of the machine learning model of the plurality of machine learning models; and
    selecting the first state of the machine learning model for generation of the ensembled machine learning model based at least in part on determining that the second validation performance value is less than the first validation performance value.

6. The method of claim 1, wherein the plurality of machine learning models are trained using a gradient based technique.

7. The method of claim 1, wherein the respective outputs from the plurality of machine learning models comprises a respective vector for each machine learning model and the output of the ensembled machine learning model comprises the dimension-wise average of the respective vector.

8. An apparatus for machine learning model training, comprising:
    a processor;
    memory coupled with the processor; and
    instructions stored in the memory and executable by the processor to cause the apparatus to:
        perform training of a plurality of machine learning models on a first data set associated with a first domain, wherein the plurality of machine learning models comprises respective sets of parameters that are updated across a plurality of iterations during the training, wherein the training comprises, for each machine learning model of the plurality of machine learning models, inputting, as values for a set of parameters of the respective sets of parameters and for an iteration of the plurality of iterations, a moving average of the set of parameters calculated over a threshold number of previous iterations;
        select a plurality of model states that are generated during the training of the plurality of machine learning models, wherein the plurality of model states are selected based at least in part on a validation performance of the plurality of model states performed during the training;
        generate an ensembled machine learning model by aggregating the plurality of machine learning models corresponding to the plurality of selected model states; and
        perform a machine learning prediction using the ensembled machine learning model on a second data set associated with a second domain different from the first domain, wherein an output of the ensembled machine learning model is a dimension-wise average of respective outputs from the plurality of machine learning models in the ensembled machine learning model.

9. The apparatus of claim 8, wherein the instructions are further executable by the processor to cause the apparatus to:
determine, for one or more iterations of the plurality of iterations, a validation performance value associated with a current state of a machine learning model of the plurality of machine learning models; and
select a model state for one or more machine learning models of the plurality of machine learning models based on a highest validation performance value for the corresponding machine learning model across all iterations of the plurality of iterations.

10. The apparatus of claim 8, wherein the instructions are further executable by the processor to cause the apparatus to:
determine, for a first iteration following the threshold number of previous iterations, a first set of values for the set of parameters of a machine learning model of the plurality of machine learning models; and
determine, for a second iteration following the first iteration, a second set of values for the set of parameters of the machine learning model based at least in part on the moving average of the set of parameters calculated during the first iteration.

11. The apparatus of claim 8, wherein the instructions are further executable by the processor to cause the apparatus to:
start a calculation of the moving average of the set of parameters after a configured number of iterations from a starting iteration of the plurality of iterations.

12. The apparatus of claim 8, wherein the instructions are further executable by the processor to cause the apparatus to:
determine, for a first iteration, a first validation performance value associated with a first state of a machine learning model of the plurality of machine learning models;
determine, for a second iteration following the first iteration, a second validation performance value associated with a second state of the machine learning model of the plurality of machine learning models; and
select the first state of the machine learning model for generation of the ensembled machine learning model based at least in part on determining that the second validation performance value is less than the first validation performance value.

13. The apparatus of claim 8, wherein the plurality of machine learning models are trained using a gradient based technique.

14. The apparatus of claim 8, wherein the respective outputs from the plurality of machine learning models comprises a respective vector for each machine learning model and the output of the ensembled machine learning model comprises the dimension-wise average of the respective vector.

15. A non-transitory computer-readable medium storing code for machine learning model training, the code comprising instructions executable by a processor to:
perform training of a plurality of machine learning models on a first data set associated with a first domain, wherein the plurality of machine learning models comprises respective sets of parameters that are updated across a plurality of iterations during the training, wherein the training comprises, for each machine learning model of the plurality of machine learning models, inputting, as values for a set of parameters of the respective sets of parameters and for an iteration of the plurality of iterations, a moving average of the set of parameters calculated over a threshold number of previous iterations;
select a plurality of model states that are generated during the training of the plurality of machine learning models, wherein the plurality of model states are selected based at least in part on a validation performance of the plurality of model states performed during the training;
generate an ensembled machine learning model by aggregating the plurality of machine learning models corresponding to the plurality of selected model states; and
perform a machine learning prediction using the ensembled machine learning model on a second data set associated with a second domain different from the first domain, wherein an output of the ensembled machine learning model is a dimension-wise average of respective outputs from the plurality of machine learning models in the ensembled machine learning model.

16. The non-transitory computer-readable medium of claim 15, wherein the instructions are further executable by the processor to:
determine, for one or more iterations of the plurality of iterations, a validation performance value associated with a current state of a machine learning model of the plurality of machine learning models; and
select a model state for one or more machine learning models of the plurality of machine learning models based on a highest validation performance value for the corresponding machine learning model across all iterations of the plurality of iterations.

17. The non-transitory computer-readable medium of claim 15, wherein the instructions are further executable by the processor to:
determine, for a first iteration following the threshold number of previous iterations, a first set of values for the set of parameters of a machine learning model of the plurality of machine learning models; and
determine, for a second iteration following the first iteration, a second set of values for the set of parameters of the machine learning model based at least in part on the moving average of the set of parameters calculated during the first iteration.

18. The non-transitory computer-readable medium of claim 15, wherein the instructions are further executable by the processor to:
start a calculation of the moving average of the set of parameters after a configured number of iterations from a starting iteration of the plurality of iterations.

19. The non-transitory computer-readable medium of claim 15, wherein the instructions are further executable by the processor to:
determine, for a first iteration, a first validation performance value associated with a first state of a machine learning model of the plurality of machine learning models;
determine, for a second iteration following the first iteration, a second validation performance value associated with a second state of the machine learning model of the plurality of machine learning models; and
select the first state of the machine learning model for generation of the ensembled machine learning model based at least in part on determining that the second validation performance value is less than the first validation performance value.

20. The non-transitory computer-readable medium of claim 15, wherein the plurality of machine learning models are trained using a gradient based technique.

* * * * *